United States Patent [19]

Horner et al.

[11] 3,892,002

[45] July 1, 1975

[54] CAR CLEANING APPARATUS

[76] Inventors: John A. Horner, 211 E. Grove Street, Kawkawlin, Mich. 48631; Harold C. Baldauf, 10361 Lakewood St., Saginaw, Mich. 48603

[22] Filed: May 7, 1973

[21] Appl. No.: 358,010

[52] U.S. Cl. ............................. 15/21 D; 15/DIG. 2
[51] Int. Cl. .................................................. B60s 3/06
[58] Field of Search ............ 15/DIG. 2, 21 D, 21 E, 15/53, 97

[56] References Cited
UNITED STATES PATENTS

| | | | |
|---|---|---|---|
| 3,432,870 | 3/1969 | Emanuel et al. | 15/21 D |
| 3,559,225 | 2/1971 | Gougoulas | 15/DIG. 2 |
| 3,570,034 | 3/1971 | Lanfrankie | 15/DIG. 2 |
| 3,662,419 | 5/1972 | Dinl | 15/21 E |
| 3,772,725 | 11/1973 | Shelstad | 15/21 D |
| 3,798,695 | 3/1974 | Weigele et al. | 15/21 E |
| 3,812,549 | 5/1974 | Hanna | 15/21 D |

FOREIGN PATENTS OR APPLICATIONS

| | | | |
|---|---|---|---|
| 1,498,059 | 10/1967 | France | 15/DIG. 2 |
| 1,523,276 | 3/1968 | France | 15/DIG. 2 |
| 1,951,067 | 10/1970 | Germany | 15/DIG. 2 |

*Primary Examiner*—Edward L. Roberts
*Attorney, Agent, or Firm*—John J. Swartz

[57] ABSTRACT

Apparatus for cleaning the outside of a vehicle moving forwardly through a cleaning station comprising a support arm mounted on a frame for swinging movement between an extreme forward position and an extreme rearward position, a carriage mounted on the arm for swinging movement therewith and for to-and-fro movement thereon, a rotary brush mounted on the carriage in the path of a vehicle and engageable by the vehicle to clean successively the front, side and rear of the vehicle as the vehicle moves through the cleaning station.

11 Claims, 12 Drawing Figures

CAR CLEANING APPARATUS

BACKGROUND OF THE INVENTION

This invention relates to car cleaning or washing apparatus including a swingable support arm mounting a rotary cleaning brush for to-and-fro movemenet thereon to wash successively the front, side and rear of a forwardly moving vehicle.

With ever-increasing building and land costs, it is imperative that car washing apparatus occupy as little space as possible. In one prior art car washing appaaratus, a pair of rotary brushes are longitudinally staggered to engage successively the front, opposite sides, and rear of a forwardly moving automobile, thus necessitating a long washing bay. In other types of car washing systems, the car washing brushes are moved over a substantially long, longitudinal path of travel while washing a single car, also necessitating a relatively long and expensive washing bay housing. Accordingly, it is an object of the present invention to provide car cleaning apparatus having minimum space requirements.

In car washing systems of the type wherein an automobile is washed while being drawn forwardly through a wash station by a power driven cable or the like, an automobile operator, unfamiliar with this type car wash apparatus will occasionally drive his car through the car wash system at a high rate of speed, rather than permit it to be drawn slowly through the washing apparatus. Rotary car washing brushes of the wrap-around type, which are mounted in the path of the rapidly moving vehicle, frequently do not swing out of the path of the vehicle sufficiently quickly and are damaged. Accordingly, another object of the present invention is to provide car washing apparatus including a wrap-around rotary brush which washes the front, side and rear of a vehicle and is quickly movable out of the path of a vehicle moving at an abnormally high rate of speed through a car washing station.

Still another object of the present invention is to provide car cleaning apparatus including a swingable arm mounting a rotary brush for swinging movement therewith and for to-and-fro movement thereon as the arm swings to clean the front, side and rear of a forwardly moving vehicle.

Yet another object of the present invention is to provide car washing apparatus of the type described including a brush-supporting carriage movable with, and in a to-and-fro path on, a swingable arm, and cam apparatus in the path of the carriage for controlling the longitudinal position of the carriage on the arm as the arm swings.

A further object of the present invention is to provide car washing apparatus of the type described including a rotary brush mounting carriage mounted on a swingable arm for swinging movement therewith and for to-and-fro movement thereon, and a biasing member reacting between the frame and the carriage for yieldably urging the carriage and the brush toward one end of the arm but permitting movement thereof to the other end of the arm.

A still further object of the present invention is to provide apparatus of the type described including a swingable arm having a free end mounting a rotary car cleaning brush and which is swingable between extreme forward and rearward positions as a vehicle moves forwardly, and a yieldable member reacting between the free end of the brush mounting arm and the frame for urging the arm and the brush to a longitudinally central position.

Other objects and advantages of the present invention will become apparent from the following description.

SUMMARY OF THE INVENTION

Apparatus for cleaning a vehicle passing through a washing station comprising: a frame; a rotary car cleaning brush; a support arm swingably mounted on the frame; a carriage mounted on the arm for swinging movement therewith and for movement thereon in a to-and-fro path of travel as the arm swings on the frame; a rotary brush mounted on the carrige in the path of a forwardly moving vehicle and movable with the carriage as the vehicle engages the brush to clean successively the front, side and rear of the vehicle.

The present invention may more readily be understood by reference to the accompanying drawings in which.

DESCRIPTION OF THE PREFERRED EMBODIMENT

Apparatus constructed according to the present invention comprises a pair of vehicle brushing or cleaning units, generally designated 14, mounted on a frame, generally designated F, including a pair of upstanding side walls 10 spanned by a top wall 12.

The vehicle brushing units 14 are identical in construction except that they are mouted on opposite sides of the frame to open in opposite directions to brush and clean opposite sides of the vehicle. Accordingly, only one of the brushing units 14 will be described in detail.

Figure 11:
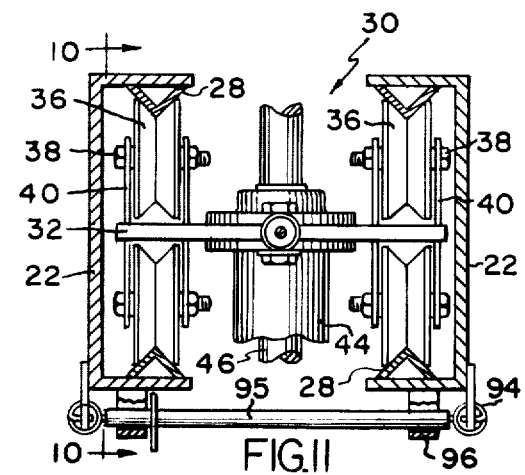
FIG. 11 is a sectional end view, taken along the line 11—11 of FIG. 10.
Figure 12:
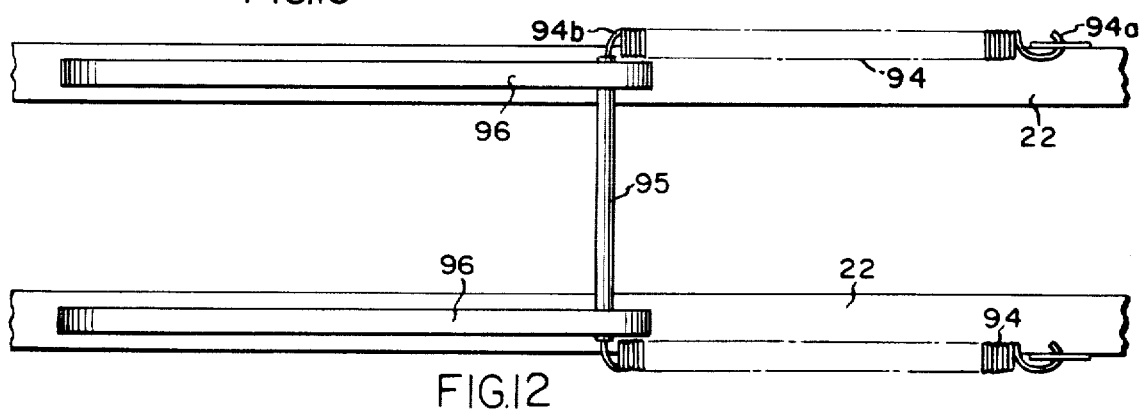
FIG. 12 is an enlarged, underplan view illustrating a portion of the brush mounting apparatus, taken on the line12—12 of FIG. 1.

Each car washing unit 14 includes a support arm, generally designated 16, fixed to a vertical shaft 18 jounrnaled in frame-supported bearing blocks 20. The arm 16 is swingably movable in a path clearing the top of an automobile, generally designated A, between extreme forward and rearward positions, illustrated in FIGS. 4 and 7, respectively. The support arm 16 includes a pair of longitudinal side channel members 22 (FIG. 11) spanned by cross bars 24. An end bracket 26 spans the laterally outer ends of channel members 22 and is fixed to the shaft 18. Pairs of opposing V-shaped rails or tracks 28 are provided along the entire lenth of the channel members 22 and mount a brush supporting carriage generally designated 30.

The brush supporting carriage 30 includes a horizontally disposed mounting plate 32 having generally vertical mounting plates 40 supporting bolts 38 journaling peripherally grooved, nylon rollers 36 which are received by the tracks 28 for longitudinal movement thereon. A rotary brush mounting cylinder 44 depends from the carriage plate 32 and journals a rotary brush drive shaft 46 mounting a conventional wrap-around brush 48 at the lower end thereof for movement therewith. The brush 48 is of the type having a small diameter core mounting soft bristles which fly radially outwardly from the collapsed positions illustrated in FIG. 1 to the extended positions illustrated in FIG. 2 when the brush is rotated about the axis of drive shaft 46. The brushes 48 are rotated in opposite directions, represented by the arrows a and b, (FIG. 2) by motors 50 supported atop the arms 16 driving gear reduction units 52 having their outputs coupled to the brush supporting shafts 46.

Figure 1:
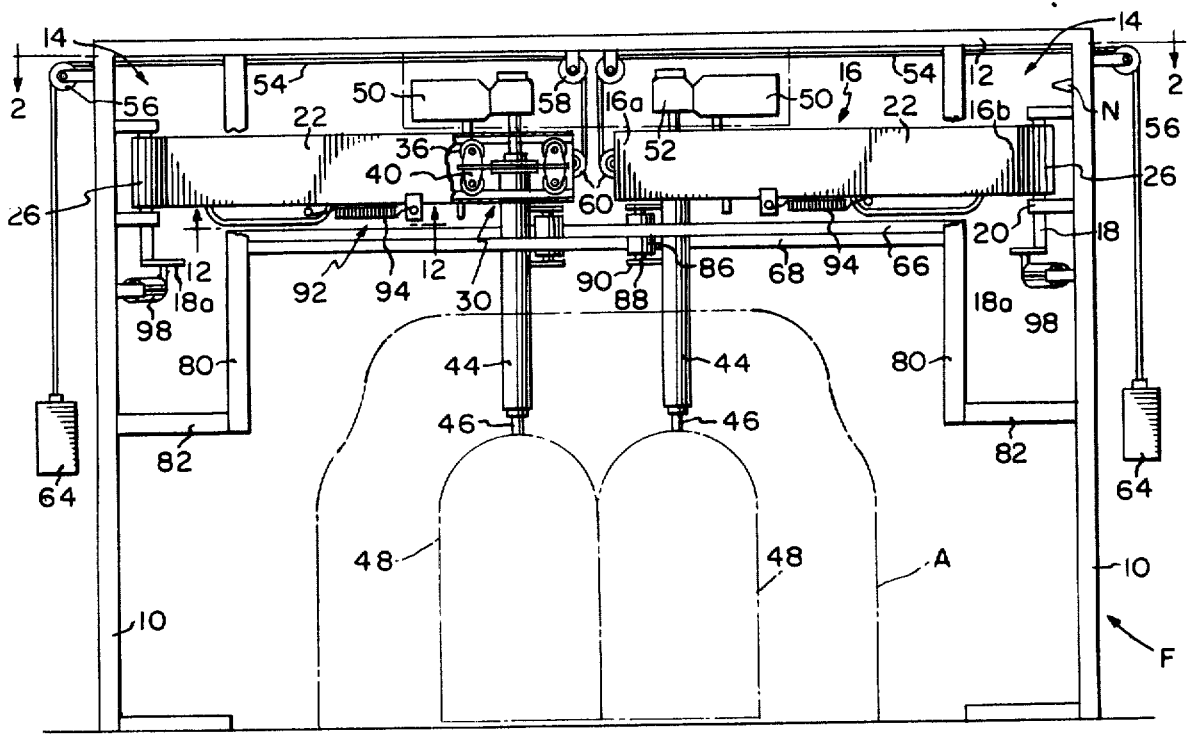
FIG. 1 is an end elevational view of car washing apparatus constructed according to the present invention, part of one of a pair of brush mounting arms being broken away to illustrate more clearly a brush supporting carriage thereon, and part of the frame being broken away to illustrate more clearly the brush mounting arms.
Figure 2:
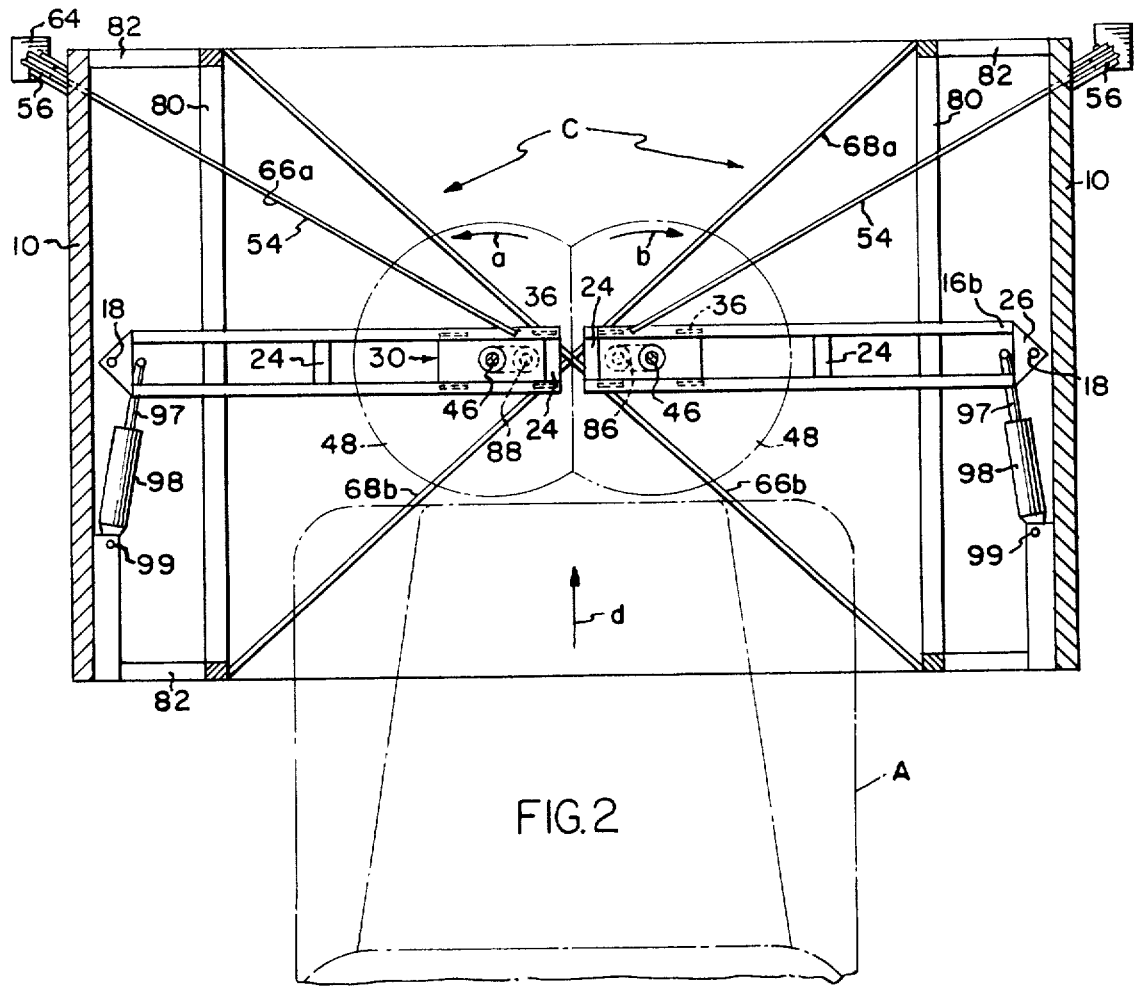
FIG. 2 is a sectional plan view of the car washing apparatus illustrated in FIG. 1, taken along the line 2—2 of FIG. 1.

Apparatus is provided for yieldably urging the brush supporting carriage 30 and swingable support arm 26 to the "rest" or "home" position, illustrated in FIGS. 1 and 2, and comprises a cable 54 trained around a pair of frame-supported pulleys 56 and 58 and a pulley 60 swivelably mounted about a horizontal axis at the laterally inner, free end 16a of the arm 16. One end 55 of the cable 54 is coupled to the carriage plate 32 and the opposite end 57 of the cable 54 supports a counterweight 64. The frame supported pulley 58 is mounted directly above the free end 16a of the brush supporting arm 16 in the rest or home position so that the weight of the counterweight 64 acts to urge the arm 16 to the longitudinally central position, illustrated in FIG. 2, and the carriage 30 to a position at the laterally inner, free end 16a of the arm 16, as also is illustrated in FIG. 2.

Figure 3:
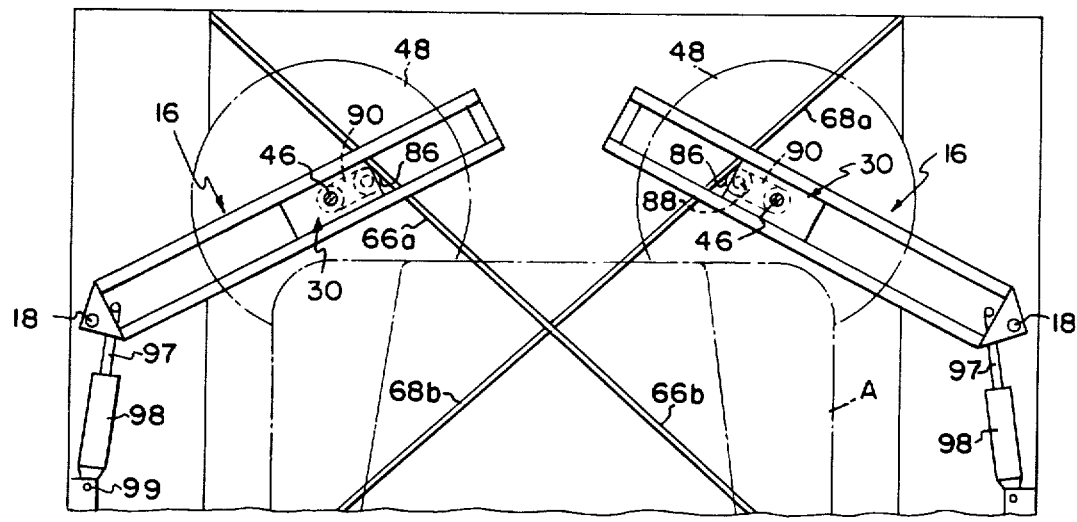
FIGS. 3 through 9 are partially schematic, top plan views illustrating the car washing apparatus in various sequential positions during a car washing cycle.
Figure 4:
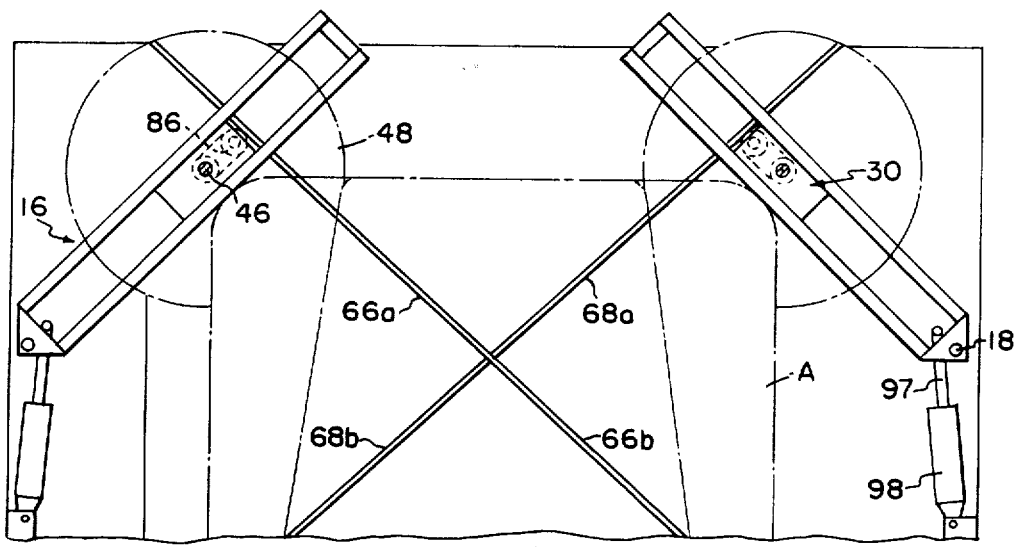

Cam apparatus, generally designated C, is provided for moving the brush supporting carriages 30 toward the pivoted end 16b of the support arm 16 as the support arm 16 and brush supporting carriage 30 swing forwardly from the positions illustrated in FIG. 2 to the positions illustrated in FIG. 4, and for controlling the return movement of the carriage from the pivoted end 16b to the free end 16a. The cam apparatus C includes upper and lower, diagonally extending cam bars 66 and 68 fixed at opposite ends to a pair of upstanding, U-shaped, frame bars 80 that are fixed to the top wall 12 and to pairs of mounting bars 82 on the side walls 10. A follower roller 86 is mounted on each carriage and includes trunnions 88 journaled in vertically spaced mounting plates 90 fixed to the brush mounting cylindrical housing 44 beneath the arm 16. The follower rollers 86 engage the forwardly diverging portions 66a and 68a of the upper cam bars 66 and 68, respectively, when the arms 16 swing forwardly to the positions illustrated in FIGS. 3 and 4.

The rollers 86 react with the forwardly diverging cam bar portions 66a and 68a to force the brush supporting carriages 30 laterally outwardly along the arm supported tracks 28 toward the pivoted ends 16b of the support arms 16. Such movement of the carriages will force the counterweights 64 upwardly from the positions illustrated in FIG. 1. Because the rotary brushes 48 move away from the free ends 16a of the arms 16 when the arms 16 swing from the rest positions, illustrated in FIG. 2, the frame side walls 10 can be shorter than otherwise would be necessary if the rotary brushes 48 were held at the ends of the arms 16. The forwardly diverging cam bar portions 66a and 68a also assist the brush members 48 in negotiating obstructions or sharp protrusions, such as forwardly protruding fenders and bumper guards, and the like, on the front of the vehicle A which otherwise would tend to prevent the brush from swinging laterally.

To bias the rotary brush 48 against the side of the automobile A with sufficient pressure to insure proper cleaning and to insure that the rotary brush 14 will walk back along the side of the automobile A, carriage return apparatus, generally designated 92, is provided and includes a pair of springs 94, each having one end 94a fixed to the arm 16 and an opposite end 94b fixed to an end of a cross bar 95 slidably mounted on a pair of guide rails 96 underlying the support arm 16. The bar 95 is in the path of the brush mounting cylinder 44 as it moves from the free end 16a of the arm 16 toward the pivoted end 16b of the support arm 16. The brush mounting cylinder 44 will move the cross bar 95 toward the pivoted end 16b, tensioning the springs 94 which urge the brush 46 laterally inwardly toward the free end 16a of the arm 16. To regulate the swinging rate of the arm 16, a damping cylinder 98 is pivoted on the side wall 10 by a pivot pin 99 and includes a piston rod 97 coupled to a flange 10a fixed to the lower end of the shaft 18. Fluid will pass from one end of the cylinder 98 to the other end via an adjustable valve which can be adjusted to control and damp the fluid flow and rapid rate of swinging.

Figure 8:
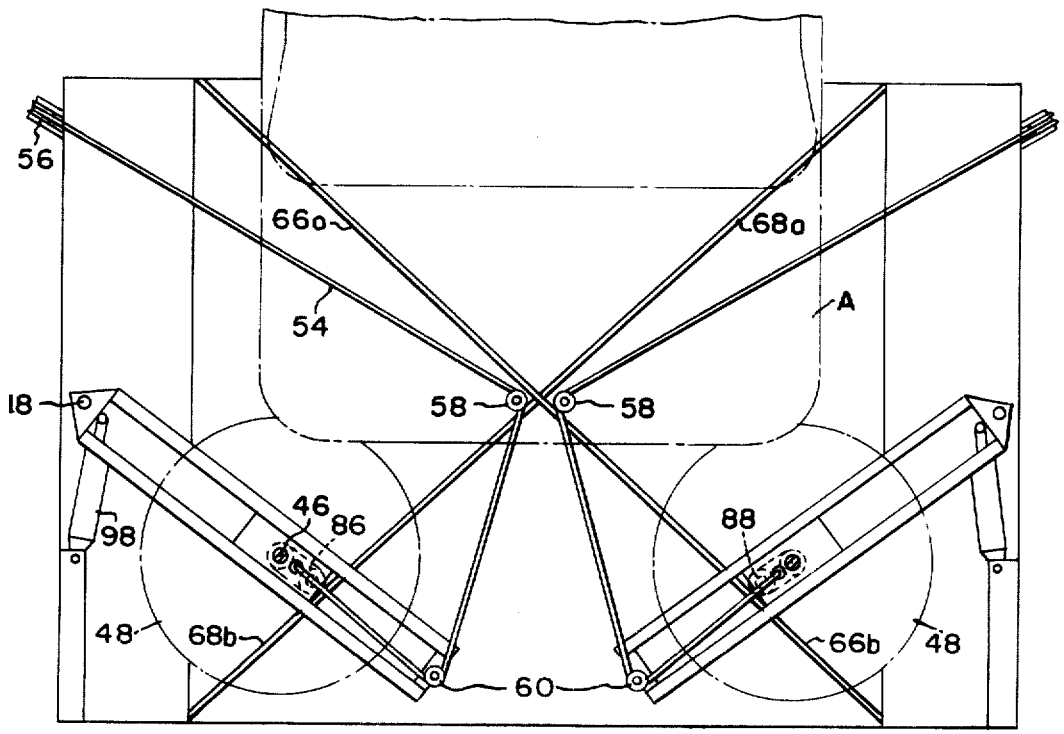
Figure 9:
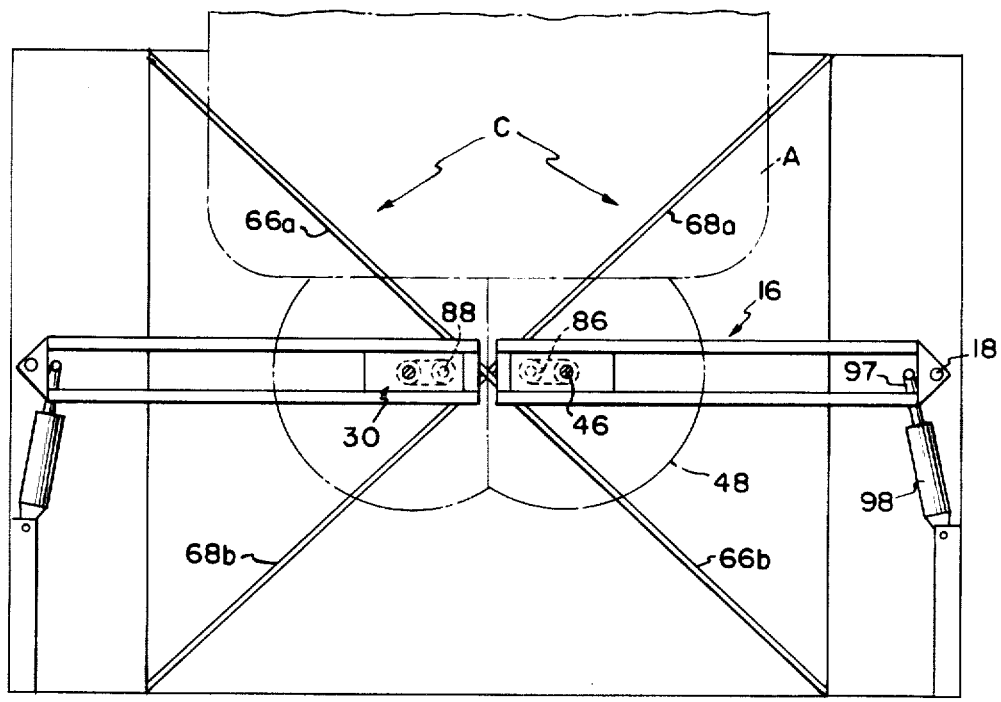
Figure 10:
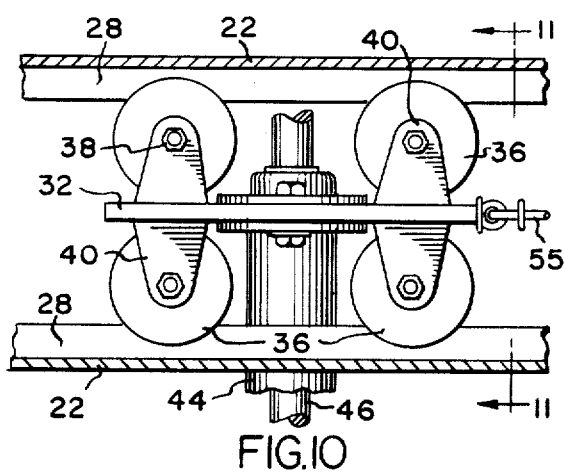
FIG. 10 is an enlarged, sectional side view particularly illustrating a brush supporting carriage, taken on the line 10—10 of FIG. 11.

The carriage supported cam follower rollers 86 engage rearwardly diverging portions 66b and 68b of cam bars 66 and 68, respectively, which preclude the fast sweepback of the carriages 30 on the arms 16 from the positions shown in FIG. 8 to the positions shown in FIG. 2. The rearwardly diverging cam bar portions 66 and 68 force the rotary brushes 48 (FIG. 1) from the positions illustrated in FIG. 8 to the positions illustrated in FIG. 9 to insure that the brushes 48 are always crowded or crammed against the rear of the vehicle. This also insures that the rotary brushes 48 negotiate obstacles such as bumper guards and rearwardly protruding fenders that might otherwise prevent swinging movement.

Apparatus (not shown) is provided for drawing the automobile A in a forward path through the car washing station in a known manner and fluid-emitting nozzles N are provided on the side wall 10 for spraying water and other cleansing liquid on the automoblie A as it passes through the washing station.

THE OPERATION

An automobile A is driven forwardly in the direction of the arrow d (FIG. 2) to the position illustrated in FIG. 2. The arm supported motors 50 are energized to drive the brush supporting shafts 46 causing the brushes 48 to rotate in opposite directions whereupon the bristles rise from the collapsed positions illustrated in FIG. 1 to the extended positions illustrated in FIG. 2. The automobile is slowly drawn through the wash station to engage the brushes 48 and move them forwardly. As the brushes move forwardly, the brushes 48, carriages 30 and arms 16 swing forwardly about the axes of the frame supported pivot pins 18. The carriage supported cam follower rollers 86 engage the forwardly diverging cam bar portions 66a and 68a, of the cam bars 66 and 68, respectively, to force the carriages 30 toward the pivoted ends 16b of the support arms 16. As the car A continues to move forwardly to the position illustrated in FIG. 4, the arms 16 are swung forwardly and laterally outwardly to extreme forward positions. The carriages and brushes 48 are cammed toward the pivoted ends 16b of the arms 16 to the positions illustrated in FIG. 4 at the sides of the vehicle A. As the vehicle A proceeds forwardly, the brush exerts a force on the car as it rotates. The reaction force of the car on the brush tends to move the brush along the car causing it to walk back.

Figure 5:
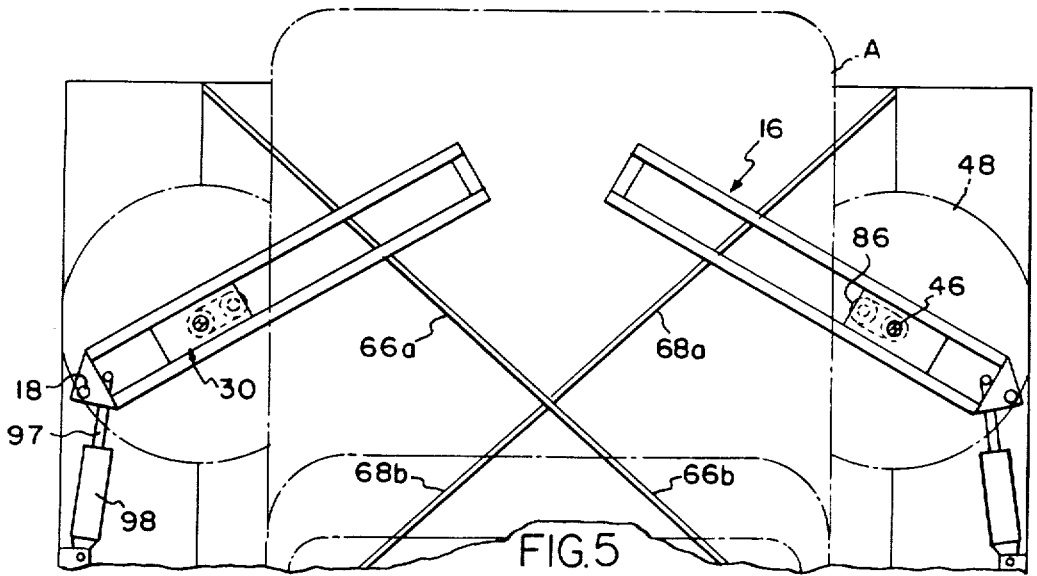
Figure 6:
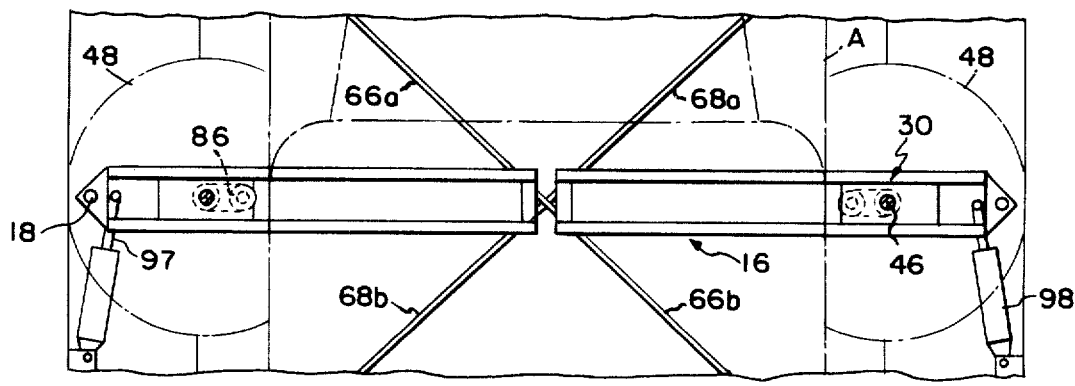
Figure 7:
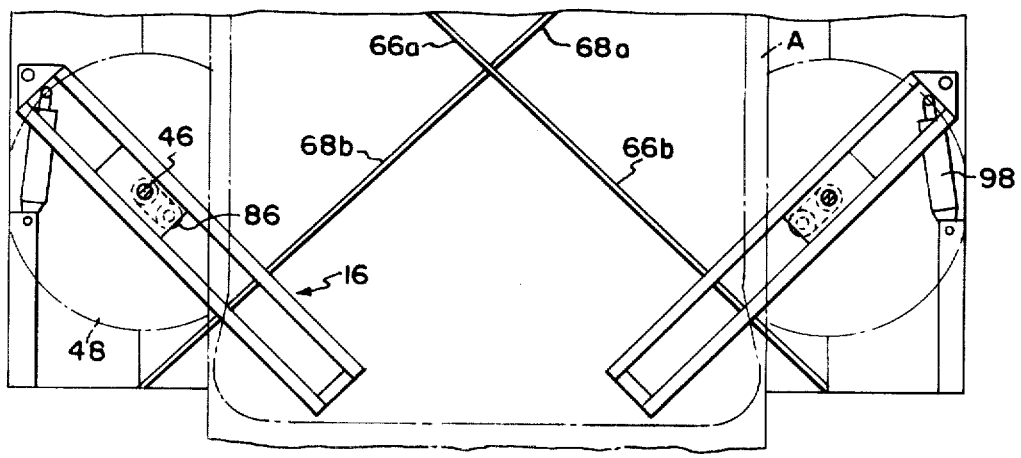

The springs 94 are in tension at this time maintaining the brushes 48 in intimate engagement with the sides of the automobile and also aid the brushes to walk back from the positions illustrated in FIG. 5 to the positions illustrated in FIG. 7. When the arms 16 are swung to the positions illustrated in FIGS. 3, 4 and 5, the counterweights 64 continue to urge the brush support arms 16 and the carriages 30 to return to the rest positions illustrated in FIG. 2. The reaction force of the brush with the side of the car and the force of the springs 66 is sufficient to overcome the force of weights 64 and force the arms 16 to swing rearwardly to the positions illustrated in FIG. 7. The brush supporting carriages 30 are then moved toward the free ends of the arms 16 as the arms 16 swing to the positions illustrated in FIG. 7. As the vehicle continues to move forwardly, the carriages 16 will be biased inwardly to the positions illustrated in FIG. 8 to engage the rail portions 66b and 68b which will serve as a regulator to prevent the fast sweepback of the brushes 48 and carriages 30 to the free ends 16a of the arms 16 and will maintain the brushes 48 crammed against the back of the automobile A. The counterweights 64 will force the brushes 48 and arms 16 to return to the rest or home positions illustrated in FIG. 9 so that the system is ready to wash another car.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Apparatus for cleaning the outside of a vehicle moving in a longitudinal path forwardly through a cleaning station comprising:
    a frame;
    a rotary vehicle cleaning brush; and
    means mounting the brush on the frame for longitudinal and lateral movement from a rest position in said path longitudinally forwardly and laterally outwardly to an extreme forward position at the side of the path, then rearwardly alongside said path to an extreme rear position, and then laterally inwardly and forwardly to the rest position, said mounting means including:
    support means mountd on the frame for swinging movement between a rest position and extreme forward and rearward positions;
    carrier means mounting the brush on the support means for swinging movement therewith and for movement thereon in a to-and-fro path of travel from a laterally inner position at one end of said support means to a laterally outer position at the other end thereof, and return, while said support means swings; and
    cam means on said frame in the path of one of said carrier means and said brush for controlling the movement of said brush on said support means as said support means swings between said rest position and said extreme forward and rear positions.

2. The apparatus of claim 1 wherein said carrier means comprises a carriage on said support means mounting said rotary brush, and means mounting said carriage on said support means for movement in said to-and-fro path of travel as said support means swings on said frame.

3. The apparatus of claim 2 wherein said support means comprises an elongate support arm having a laterally outer end swingably moutned on said frame and a free end; said means mounting said brush on said frame including yieldable means reacting between said frame and said carriage for yieldably urging said carriage to said free end but permitting movment thereof toward the laterally outer end as said support arm swings on side frame.

4. The appartus of claim 3 wherein said yieldable means includes a counterweight reacting between said carriage and a portion of said frame adjacent the free end of said arm when the brush is at said rest position.

5. The apparatus of claim 4 wherein said means mounting said brush on said frame includes additional yieldable means operable to store energy when said brush is moved toward said other end for urging said brush toward said free end of said arm and the side of said path.

6. The apparatus of claim 2 wherein said means mounting said brush on said frame includes means normally urging said support means to said rest position between the extreme forward and rear positions of said support means, and means for normally urging said brush to said laterally inner position, but permitting movement thereof on said support means to said laterally outer position.

7. The apparatus of claim 1 wherein said cam means comprises a pair of laterally outwardly diverging guide rails.

8. The apparatus of claim 1 wherein said cam means is in the path of said carrier means to guide said carrier means and said brush toward said other end of said support means as said carrier means and said brush move to said extreme forward position, and to guide said carrier means and said brush toward said one end of said support means as said carrier means and said brush move from said extreme rear position to said rest position.

9. Apparatus for cleaning the outside of a vehicle moving forwardly through a washing station in a longitudinal path of travel comprising:
    a stationary frame;
    a pair of support arms pivotally mounted at the laterally outer ends thereof on said frame for movement about axes which are laterally outwardly of said path between a position extending transversely to said path and positions forwardly and rearwardly of said transversely extending position; said support means having free ends normally disposed laterally inwardly of said axes;

carriage means mounted in said support arms for movement therewith and for to-and-fro movement thereon as said arms swing on said frame between laterally inner positions adjacent said free ends and laterally outer positions adjacent said laterally outer ends; and a pair of rotary brush means mounted on said carriage means for movement therewith from abutting rest positions, in said path laterally inwardly of said axis, forwardly and laterally outwardly away from each other by said automobile passing through said station to extreme forward positions at the sides of said path, then rearwardly alongside said path to extreme rear positions, and then laterally inwardly and forwardly toward each other to said rest positions.

10. Apparatus for cleaning a vehicle moving forwardly in a longitudinal path through a cleaning station comprising:

a stationary frame;

a support arm pivotably mounted at one end on said frame and including a free end swingable between a rest position and extreme forward and rear positions;

a rotary vehicle cleaning brush;

means mounting said brush at the free end of said arm for swinging movement with said arm, said brush being mounted such that said brush is in said path when said arm is in said rest position, and yieldable means reacting between said frame and said free end of said arm for yieldably urging said arm to a rest position between said forward and rear positions, but permitting swinging movement of said arm to said forward and rear positions; said brush mounting means comprising a carriage movable on said support arm as said support arm swings;

said yieldable means being connected to said carriage means for urging said carriage means toward said free end.

11. Apparatus for cleaning a vehicle moving forwardly in a longitudinal path through a cleaning station comprising:

a stationary frame;

a support arm pivotably mounted at one end thereof on said frame and including a free end swingable between a rest position and extreme forward and rear positions;

a rotary vehicle cleaning brush;

means mounting said brush at the free end of said arm in said path for swinging movement with said arm;

yieldable means reacting between said frame and said free end of said arm for yieldably urging said arm to a rest position between said forward and rear positions, but permittting swinging movement of said arm to said forward and rear positions;

said yieldable means urging said free end to a laterally inner position, but permitting swinging movement thereof to a laterally outer position; and cam means in the path of one of said brush and said brush mounting means for preventing a fast sweep back of said free end from said extreme rear position to said rest position.

* * * * *